Sept. 18, 1928.
K. O. KELLER
1,684,629
PISTON FOR INTERNAL COMBUSTION ENGINES
Filed Feb. 1, 1926
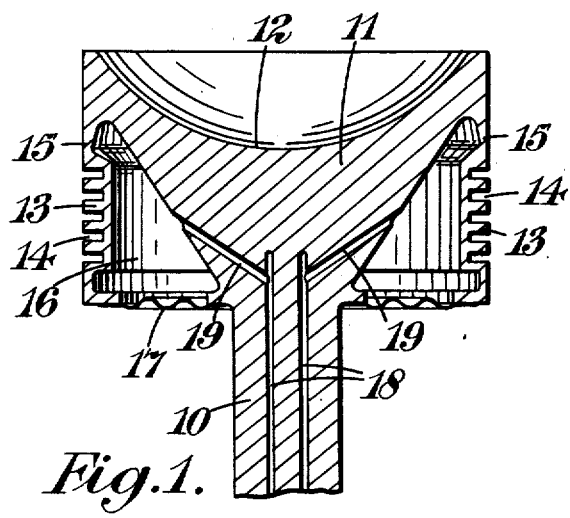
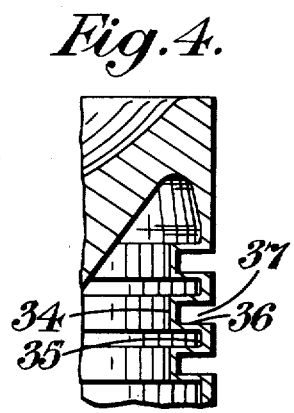
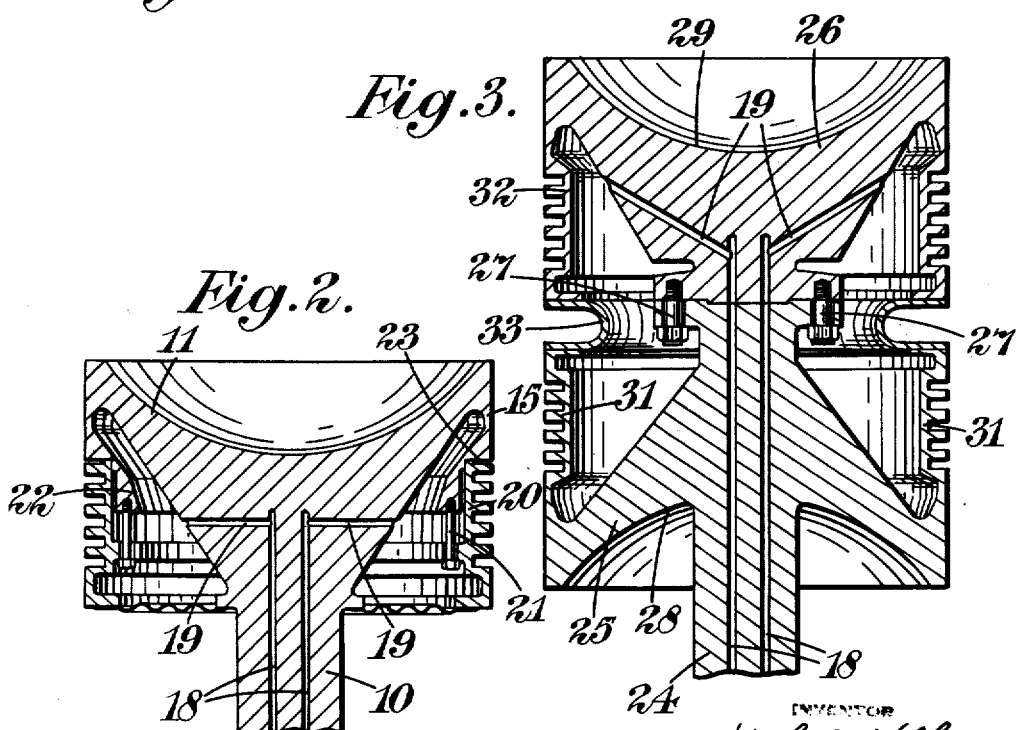

Patented Sept. 18, 1928.

1,684,629

UNITED STATES PATENT OFFICE.

KARL OTTO KELLER, OF SUNDERLAND, ENGLAND, ASSIGNOR TO ROBERT PILE DOXFORD, OF SUNDERLAND, ENGLAND.

PISTON FOR INTERNAL-COMBUSTION ENGINES.

Application filed February 1, 1926, Serial No. 85,238, and in Great Britain November 19, 1925.

This invention is for improvements in or relating to pistons for use in internal-combustion engines, wherein, as is well known, the working parts are subjected to high temperatures. It is also known that the piston-rings of such an engine are liable to become coated with carbonized oil, and therefore to become fixed in their grooves, so that they are not free to exercise their function of making a pressure-tight joint. When this happens, a serious loss of power results, owing to the leakage of the hot gases past the rings, commonly known as "blowing-through", and this leakage, moreover, raises the temperature of the piston and cylinder, destroys the film of lubricating oil and causes increased wear on the cylinder liner. One reason for these difficulties is that the piston-rings are insufficiently cooled, and the object of the present invention is to provide an improved construction of piston in which the piston-rings can be effectively cooled to overcome the disadvantages above mentioned.

This invention accordingly comprises in a piston provided with a piston-ring-carrier, a thin annular connection which, on the one hand, connects structurally the carrier to the piston, and on the other hand, provides for such heat as flows from the piston-body towards the rings through the said connection, a path of as small a cross-sectional area as is practicable. Preferably the annular connection aforesaid is of uniform radial thinness, as hereinafter described.

According to another feature of this invention, the thin annular connection aforesaid is cooled upon its inner face by a cooling fluid.

According to yet another feature of this invention, the piston-ring-carrier aforesaid when used in an internal-combustion engine is thin in the neighbourhood of the rings in order to provide for such heat as flows towards the rings through the carrier, a path of as small cross-sectional area as is practicable. This thinness is beneficial in another way, in that it provides for such heat as flows from the piston-rings towards the cooling-fluid, a path that is as short as possible.

Preferably the piston-ring-carrier is cooled upon its inner face, by means of a cooling fluid in contact therewith.

According to yet another feature of this invention, the inner face of the carrier is grooved adjacent the flat sides of the grooves which receive the piston-rings, whereby the cooling fluid can be brought into as close proximity as possible with the piston-rings which it is required to cool.

According to yet another feature of this invention, the piston-ring-carrier is connected with the crown of the piston only by the thin annular connection aforesaid; if radial support is required for the carrier, it is provided by a connection at that end of the carrier remote from the piston-crown.

When this invention is applied to a double-ended piston, there may be provided two piston-ring-carriers, each of which is connected to the piston by a thin annular connection as aforesaid, with or without an expansion-ring connecting the two carriers, in the manner hereinafter described.

This invention is of particular advantage when applied to internal-combustion engines of the type in which the piston is so constructed and used that its end exposed to the combustion which occurs in the combustion-chamber is maintained at a high temperature, of the order of 450° C. throughout the power stroke of the engine.

In the accompanying drawings—

Figure 1 is a sectional elevation of one construction of piston embodying the present invention;

Figure 2 is a similar view of a modified construction;

Figure 3 is a similar view of a double-ended piston whereto the invention is applied; and Figure 4 is a part-sectional view showing yet another modification.

Like reference characters indicate like parts throughout the drawings.

In applying the present invention to a piston, it is preferred to use a forged or cast piston-body which is integral with the piston-rod whereby the pressure of the working-fluid is transmitted in the most direct manner, instead of transmitting it from the crown of the piston through the side-walls to a flange on the piston-rod or to a gudgeon-pin, and thence to the connecting-rod. Such a construction is illustrated in Figure 1, in which a piston-rod indicated at 10 has the body 11 formed integrally with it, being for example, a casting or forging. The upper surface 12 whereon the pressure of the working fluid operates may be flat or concave, as illustrated, and the body of the piston may be of substantially conical shape, also as illustrated. The piston-ring-carrier 13 is a cylindrical part formed on its outer curved surface with annular grooves 14 to receive the piston-rings. This carrier is connected to the body 11 by a thin annular ring 15 which forms the sole connection of the carrier 13 with the hot part of the piston; the only other connection between the piston-ring-carrier and the piston proper is the diaphragm 17 hereinafter referred to or an equivalent part at the lower end of the carrier; such part is not directly connected with the hot crown of the piston, and moreover is effectively cooled, so that even if such part is of such a substantial nature as to provide radial support for the carrier, it does not increase the supply of heat thereto.

Since the body 11 of the piston is integral with the piston-rod 10, the pressures of the working fluid on the crown 12 are transmitted directly to the piston-rod and not through the piston-ring-carrier 13, which later only takes such slight proportion of the fluid pressures as comes upon the piston-rings down the clearance between the body 11 and the cylinder wall, and such small thrusts as are exerted parallel to the stroke on the rings by friction and by their inertia. Also, the piston is guided in the usual manner by a crosshead at the lower end (not shown) of the rod 10 and by the cylinder wall on which the upper margin of the piston can bear; consequently the carrier 13 receives no stresses in a direction transverse to the stroke. The annular ring 15 connecting the carrier 13 to the body 11 can therefore be made very thin; for example, on a piston of twenty-eight inches diameter, the radial thickness of the part 15 need only be one-quarter of an inch. Since a substantial proportion of the heat received by the piston-rings is conveyed to them by conduction from the body 11 of the piston, the thinness of the part 15 ensures that the conducting path is of small cross-sectional area, and the amount of heat which it transmits is correspondingly reduced.

In order further to reduce the quantity of heat supplied by conduction to the piston-rings, the space 16 inside the piston-ring-carrier is closed by any suitable diaphragm 17 and a cooling-fluid is circulated through this space, entering and leaving it by passages 18, 19 which extend through the piston-rod and through the body of the piston. The circulation of a cooling-fluid in contact with the part 15 absorbs heat therefrom which would othewise be transmitted to the rings, and also prevents overheating of this thin connection.

In order to prevent overheating of the piston-rings, it is also necessary effectively to remove such heat as does reach them, and for this reason the piston-ring-carrier 13 is itself made as thin as is practicable; two results are thereby ensured, namely, that a path of only small cross-sectional area is provided for heat flowing along the carrier to the rings, and the path of heat flowing from the rings to a cooling fluid in contact with the inner face of the carrier is as short as is practicable. That is to say, the transfer of heat to the rings is impeded, and the transfer of heat from the rings is facilitated.

The part 15 which forms the connection between the body of the piston and the piston-ring-carrier is made thin, for the reasons above described, but in practice it is tapered in thickness to reduce any localized stress at its junction with the piston-crown, since the latter is not cooled whilst the part 15 is positively cooled.

In the construction illustrated in Figure 2, the piston-rod 10 and body 11 are substantially the same as in Figure 1, but the piston-ring-carrier 20, instead of being made integral with the body of the piston, is made as a separate cylindrical part which is secured, as by the bolts 21, to a flange 22, which itself is connected to the body of the piston by a thin annular connection 15 similar to the part 15 of Figure 1. This construction whereby the piston-ring-carrier is not integral with the body of the piston-ring, but is jointed thereto, as at 23, provides for a further limitation on the supply of heat by conduction to the piston-rings, owing to the comparatively low heat-conductivity of a metal joint such as is indicated at 23.

Figure 3 illustrates the invention applied to a double-ended piston, such as is used in a double-acting engine. The piston-rod 24 has one end-piece 25 formed integrally with it, and the other end-piece 26 is bolted directly to the first piece 25 or the end of the piston-rod, as indicated at 27, the two end-pieces forming a single piston with two operative faces 28, 29 respectively. Each of the pieces 25, 26 has a piston-ring-carrier 31, 32 respectively, mounted on it in the manner hereinbefore described with reference to Figure 1, and any suitable joint may be made between the adjacent ends of the two carriers. As illustrated, an expansion-ring 33 provides for the complete closure of the space inside the piston-ring-carriers 31, 32, so that the cooling-fluid can be circulated in this space, and permits relative expansion between the various parts of the complete piston to take place without subjecting the carriers to any undue stress.

Figure 4 illustrates a modified construction of piston-ring-carrier which is applicable to any of the constructions illustrated in Figures 1, 2 or 3. In order to facilitate the absorption of heat from the piston-rings by the cooling fluid which is in contact with the inner face of the carrier, this carrier 34 is provided with grooves 35 adjacent the flat sides 36 of the piston-ring-grooves 37, thereby providing for access of the cooling fluid to the flat sides of the piston-rings as well as to their inner curved faces. It will be understood that the wall adjacent these flat sides 36 is made as thin as is practicable, for the same reason as the wall 13 of the carrier is made thin, namely, that the path of flow of heat from a piston-ring to the cooling fluid shall be as short as possible.

Subject to the proviso that the thickness of the annular ring 15 and/or the dimensions of the carrier or both are calculated in the usual manner to withstand the slight mechanical stresses, which as above indicated are all that they have to sustain, the thickness of both of them should, for the thermal reasons hereinbefore set forth, be a minimum.

This invention is of particular value when applied to a piston of the kind that is so constructed and used that its end exposed to the combustion which occurs in the combustion-chamber can be maintained by the heat of that combustion at a temperature of not less than 450° C. throughout the power stroke of the engine.

In general such a piston is obtained by providing a crown or body of greater thickness, measured axially along the piston, than is usual, and the various pistons herein illustrated are suitable for use in this manner. It will be understood, however, that the invention is not limited to such particular pistons, but may be used with any type of piston in which the piston-rings become unduly heated in working.

I claim:—

1. A piston for an internal-combustion engine, having a piston-head in the form of a massive block for conserving heat, which head is provided with a substantially cylindrical carrier for piston-rings, which carrier and piston-head are connected by a thin annular connection which, on the one hand, sufficiently connects them structurally together, but on the other hand provides for a restricted flow of heat from the crown of the piston towards the rings through the said connection.

2. A piston for an internal-combustion engine, having a piston-head in the form of a massive block for conserving heat, which head is provided with a substantially cylindrical carrier, piston-rings carried by said carrier, which carrier and piston-head are connected by a thin annular connection which, on the one hand sufficiently connects them structurally together, but on the other hand provides for such seat as flows from the crown of the piston towards the rings through the said connection, a path of restricted cross-sectional area, and which piston-ring carrier is itself so thin in the neighbourhood of the rings as (a) to provide for such heat as flows towards the rings through the carrier, a path of restricted cross-sectional area and (b) to provide for the most direct path for such heat as flows from the rings through the carrier to be distributed, which thin annular connection and piston ring carrier are arranged to be cooled each upon its inner face by a cooling fluid.

3. A piston for an internal-combustion engine having a piston-rod and having a piston-head in the form of a massive block for conserving heat provided with a piston-ring carrier, wherein substantially all the pressure of the working fluid is transmitted but directly from the head to the piston-rod, which piston-head and carrier are connected together by a thin annular connection which, on the one hand sufficiently connects them structurally together, but on the other hand provides for such heat as flows from the crown of the piston-head towards the rings through the said connection, a path of restricted cross-sectional area, which piston-ring carrier is itself so thin in the neighbourhood of the rings as (a) to provide for such heat as flows towards the rings through the carrier a path of restricted cross-sectional area, and (b) to provide for the most direct path for such heat as flows from the rings through the carrier to be distributed, which thin annular connection and piston-ring carrier are arranged to be cooled each upon its inner face by a cooling fluid.

4. A piston for an internal-combustion engine, having a piston-head in the form of a massive block for conserving heat, and having a substantially cylindrical carrier having piston-ring grooves in its outer face, which carrier is connected to the piston-head by a thin annular connection which, on the one hand, sufficiently connects the same structurally together, but on the other hand provides for such heat as flows from the crown of the piston towards the rings through the said connection, a path of restricted cross-sectional area, the inner face of which carrier is provided with grooves which enter between the inner faces of two adjacent piston-ring grooves facing one another, substantially as described.

5. A piston for an internal-combustion engine, having a piston-head in the form of a massive block for conserving heat and provided with a substantially cylindrical carrier for piston rings, which piston-head and carrier are connected by a thin annular connection which, on the one hand, sufficiently connects the same structurally together, but on the other hand provides for such heat as flows from the crown of the piston body towards the rings through the said connection, a path of restricted cross-sectional area, which thin annular connection constitutes the sole connection between the said piston ring carrier and the crown of the piston.

6. A piston for an internal-combustion engine, having a piston-head in the form of a massive block for conserving heat, which head is provided with a substantially cylindrical carrier for piston-rings, which carrier and piston-head are connected by a thin annular connection which, on the one hand, sufficiently connects them structurally together, but on the other hand provides for a restricted flow of heat from the crown of the piston towards the rings through the said connection, the head being rigidly connected to the piston rod by a central supporting connection independent of the carrier.

In testimony whereof I affix my signature.

KARL OTTO KELLER.

CERTIFICATE OF CORRECTION.

Patent No. 1,684,629.     Granted September 18, 1928, to

KARL OTTO KELLER.

It is hereby certified that the above numbered patent was erroneously issued to "Robert Pile Doxford, of Sunderland, England", whereas said patent should have been issued to the inventor said "Keller and Robert Pile Doxford, of Sunderland, England," said Doxford being assignee of one-half interest only in said invention as shown by the records of assignments in this office; and that the said Letters Patent should be read with this correction therein that the same may conform to the record of the case in the Patent Office.

Signed and sealed this 20th day of November, A. D. 1928.

M. J. Moore,
Acting Commissioner of Patents.

(Seal)

head is provided with a substantially cylindrical carrier for piston-rings, which carrier and piston-head are connected by a thin annular connection which, on the one hand, sufficiently connects them structurally together, but on the other hand provides for a restricted flow of heat from the crown of the piston towards the rings through the said connection, the head being rigidly connected to the piston rod by a central supporting connection independent of the carrier.

In testimony whereof I affix my signature.

KARL OTTO KELLER.

CERTIFICATE OF CORRECTION.

Patent No. 1,684,629.            Granted September 18, 1928, to

KARL OTTO KELLER.

It is hereby certified that the above numbered patent was erroneously issued to "Robert Pile Doxford, of Sunderland, England", whereas said patent should have been issued to the inventor said "Keller and Robert Pile Doxford, of Sunderland, England," said Doxford being assignee of one-half interest only in said invention as shown by the records of assignments in this office; and that the said Letters Patent should be read with this correction therein that the same may conform to the record of the case in the Patent Office.

Signed and sealed this 20th day of November, A. D. 1928.

M. J. Moore,
Acting Commissioner of Patents.

(Seal)